(12) United States Patent
Depondt

(10) Patent No.: US 11,338,776 B2
(45) Date of Patent: May 24, 2022

(54) WIPER BLADE DEVICE

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 16/992,454

(22) Filed: Aug. 13, 2020

(65) Prior Publication Data

US 2021/0046906 A1 Feb. 18, 2021

(30) Foreign Application Priority Data

Aug. 15, 2019 (DE) .................. 102019212238.8

(51) Int. Cl.
*B60S 1/52* (2006.01)
*B60S 1/38* (2006.01)

(52) U.S. Cl.
CPC ............. *B60S 1/524* (2013.01); *B60S 1/3808* (2013.01); *B60S 1/3894* (2013.01)

(58) Field of Classification Search
CPC ....... B60S 1/524; B60S 1/3808; B60S 1/3894
See application file for complete search history.

(56) References Cited

U.S. PATENT DOCUMENTS

2008/0216274 A1* 9/2008 Egner-Walter .......... B60S 1/524
15/250.02

FOREIGN PATENT DOCUMENTS

| EP | 0860336 A1 * | 8/1998 | ............... B60S 1/38 |
| FR | 3041584 A1 | 3/2017 | |
| FR | 3056178 A1 | 3/2018 | |

OTHER PUBLICATIONS

EP0860336A1 (machine translation) (Year: 1998).*

* cited by examiner

*Primary Examiner* — Andrew A Horton
(74) *Attorney, Agent, or Firm* — Michael Best & Friedrich LLP

(57) ABSTRACT

A wiper blade device (10a; 10b; 10c) with at least one fluid channel (14a; 14b; 14c) which has at least one fluid output opening (16a, 16a'; 16b, 16b'; 16c, 16c'), in particular at least one nozzle element (50a, 50a'; 50b, 50b'; 50c, 50c'), to form a fluid output, and with at least one wind deflector unit (18a; 18b; 18c), on and/or in which the at least one fluid channel (14a; 14b; 14c) is arranged. The wiper blade device (10a; 10b; 10c) has at least one wiper blade end cap (12a, 12a'; 12b, 12b'; 12c, 12c') which forms at least one end piece of the fluid channel (14a; 14b; 14c).

20 Claims, 4 Drawing Sheets

WIPER BLADE DEVICE

BACKGROUND OF THE INVENTION

A wiper blade device with at least one fluid channel which has at least one fluid output opening, in particular at least one nozzle element, to form a fluid output, and with at least one wind deflector unit, on and/or in which the at least one fluid channel is arranged, has already been proposed.

SUMMARY OF THE INVENTION

The invention is based on a wiper blade device with at least one fluid channel which has at least one fluid output opening, in particular at least one nozzle element, to form a fluid output, and with at least one wind deflector unit, on and/or in which the at least one fluid channel is arranged.

It is proposed that the wiper blade device has at least one wiper blade end cap which forms at least one end piece of the fluid channel.

A "wiper blade device" is intended to be understood as meaning preferably at least one part, preferentially a substructure assembly, of a wiper blade, preferentially a windscreen wiper blade. The wiper blade device can also preferably comprise the entire wiper blade, preferably the entire windscreen wiper blade. The wiper blade device is preferably provided for use on a vehicle. The wiper blade device is preferably provided for cleaning a surface, preferentially a windscreen on a vehicle. The wiper blade device is preferably coupled to a vehicle, preferably to a wiper arm of a vehicle, for cleaning a vehicle windscreen. "Provided" is intended to be understood as meaning preferably specially designed, specially configured and/or specially equipped. By the fact that an object is provided for a specific function is intended to preferably be understood as meaning that the object satisfies and/or carries out this specific function in at least one application state and/or operating state. An "operating state" is intended to be understood as meaning preferably a state in which the wiper blade device is ready for operation for a wiping operation and/or a wiping mode and/or is in a wiping mode in which a wiper strip unit of the wiper blade device is guided preferentially over a vehicle windscreen and, in the process, advantageously lies against the vehicle windscreen. The wind deflector unit is preferably provided to deflect the head wind and/or for use for pressing the wiper blade, in particular the wiper blade device, against a surface to be wiped, preferably a vehicle windscreen. The wind deflector unit preferably has at least one concave incident flow surface. The wiper blade device preferably has at least the wiper strip unit. The wiper strip unit preferably has a wiper main body which is formed from at least one elastic material and has a wiper lip. A fluid channel is preferably at least one channel-like recess and/or at least one channel which is bounded by a hose-like and/or by at least one tubular element, wherein the channel-like recess and/or the channel bounded by a hose-like and/or tubular element is provided for guiding a fluid, preferably a wiping liquid. The fluid channel is preferentially at least partially bounded by the wind deflector unit and/or the wiper strip unit. The fluid channel is preferably at least partially, preferentially mostly, in the form of a hose and/or in the form of a tube. The fluid channel is preferentially at least partially, preferentially mostly, bounded by a single- or multi-part, preferably elastic, hose and/or a single-part or multi-part tube. The at least one fluid channel preferably has a constant maximum transverse extent perpendicularly to its maximum extent. The element bounding the fluid channel can be at least partially connected to the at least one wind deflector unit and/or to the at least one wiper strip unit. For example, a hose-like element which bounds the at least one fluid channel can be adhesively bonded, clamped, welded and/or fused to the wind deflector unit. The at least one fluid channel preferably has a connection to an external wiping water reservoir. The at least one fluid channel preferably has at least one, preferentially at least two, open end region/regions along its maximum extent. The at least one fluid channel preferably has at least one, preferentially a plurality of, fluid output opening/openings distributed regularly along a maximum extent of the fluid channel, such as, for example, a channel-like lead through to an external region with a constant maximum transverse extent, and/or a nozzle element, to form a fluid output. The wiper blade device preferably has at least one, preferentially at least two, wiper blade end cap/caps. The at least one wiper blade end cap preferably has a main axis of extent which is oriented at least substantially parallel to a main axis of extent of the element bounding the fluid channel. A "main axis of extent" of an object is intended to be understood as meaning preferably an axis which runs parallel to a longest edge length of a smallest cuboid which completely surrounds the object. "Substantially parallel" is intended to be understood as meaning in particular an orientation of a direction relative to a reference direction, in particular in a plane, wherein the direction has a deviation in particular of less than 8°, advantageously less than 5° and particularly advantageously less than 2°, in relation to the reference direction. The at least one wiper blade end cap is preferably arranged on the open end region of the at least one fluid channel. The at least one wiper blade end cap preferably forms at least one end piece for the at least one fluid channel in a direction along its maximum extent. An end piece for a fluid channel is preferably a component which is connectable to and separable from the fluid channel at an open end region and which either fluidically seals, in particular seals off, the fluid channel or which fluidically connects the fluid channel to an opening to form a fluid output. The at least one wiper blade end cap is preferably provided to form a plug-in connection with the at least one fluid channel. The at least one wiper blade end cap is preferably provided to be at least partially plugged into the at least one open end region of the at least one fluid channel. The at least one wiper blade end cap preferably at least partially engages around the at least one element bounding the at least one fluid channel, in particular at least one hose-like element and/or the at least one wind deflector unit. At least part of the at least one wiper blade end cap preferably extends into the at least one fluid channel for at least 0.2 cm, preferentially at least 0.4 cm, particularly preferentially at least 0.8 cm and very particularly preferentially at least as far as a fluid output opening of the fluid channel, which fluid output opening is arranged closest to the at least one open end region. The at least one wiper blade end cap preferably bounds at least one end cap cavity, in particular in which the at least one element bounding the fluid channel is arranged.

By means of the configuration according to the invention of the wiper blade device, an advantageous, in particular lateral, boundary, in particular protective boundary, of the wiper blade device, in particular of the fluid channel, can be achieved. Advantageous fluid output conditions can be achieved. An advantageous pressure distribution of a fluid in the fluid channel can be achieved. An advantageously uniform output of fluid from the at least one fluid output opening can be achieved.

Furthermore, it is proposed that the at least one wiper blade end cap has at least one connection extension which is provided to fluidically close the fluid channel or to fluidically connect the fluid channel to a fluid output element of the wiper blade end cap. The at least one connection extension preferably is/forms a limiting element, in particular to form a fluidic seal, for the fluid channel in the direction of the main axis of extent of the at least one element bounding the fluid channel. The at least one connection extension preferably extends from a central region of the at least one wiper blade end cap in the direction of an opening of the at least one end cap cavity. The at least one connection extension preferably extends from an inner wall, which is oriented at least substantially perpendicularly to the main axis of extent of the at least one wiper blade end cap, through the end cap cavity in a direction of the main axis of extent of the at least one wiper blade end cap. The expression "substantially perpendicularly" is intended to define in particular an orientation of a direction relative to a reference direction, wherein the direction and the reference direction, in particular as viewed in a plane of projection, enclose an angle of 90°, and the angle has a maximum deviation of in particular less than 8°, advantageously less than 5° and particularly advantageously less than 2°. The at least one wiper blade end cap preferably has at least two connection extensions. The at least one connection extension is preferably an elongate element with a constant maximum transverse extent. The at least one connection extension preferably has a main axis of extent which is oriented perpendicularly to its maximum transverse extent and is oriented parallel to the main axis of extent of the at least one wiper blade end cap. The maximum transverse extent of the at least one connection extension is preferably larger, preferentially at least 0.1 mm larger, than the maximum transverse extent of the at least one fluid channel. In at least one operating state, the at least one connection extension preferably at least partially extends into the at least one fluid channel. In at least one operating state, the at least one connection extension preferably extends far into the fluid channel for at least 0.2 cm, preferably at least 0.5 cm, particularly preferentially at least 1.0 cm and very particularly preferentially at least as far as a fluid output opening of the fluid channel, which fluid output opening is arranged closest to the at least one opening end channel. The at least one connection extension has at least one sealing side, in particular an outer side with a surface normal parallel to the main axis of extent of the at least one connection extension, which sealing side at least partially, preferably mostly, has a surface structure different from a flat surface. For example, the sealing side of the connection extension is at least partially and preferably mostly rounded. The sealing side is preferably at least partially beveled. The sealing side is preferably at least partially convex, in particular as viewed from the fluid channel. It is alternatively conceivable that the sealing side is at least partially concave, in particular as viewed from the fluid channel. The at least one connection extension preferably bounds at least one extension cavity in its interior. The at least one extension cavity preferably extends through the connection extension along the main axis of extent of the connection extension. The at least one extension cavity is preferably fluidically separated from the at least one fluid channel. A fluid channel geometry which is advantageously reduced in size can be achieved. An advantageously light end piece can be formed for the at least one fluid channel. An advantageous fluid output condition for fluid output openings spaced furthest away from a fluid reservoir can be achieved. In an alternative refinement of the invention, the at least one extension cavity is fluidically connectable to the at least one fluid channel. The at least one wiper blade end cap preferably has at least one fluid output element. In this refinement, the at least one extension cavity is preferably an end cap fluid channel. The at least one end cap fluid channel preferably connects the at least one fluid channel to at least one fluid output element of the at least one wiper blade end cap. The at least one fluid output element of the at least one wiper blade end cap is preferably fluidically connected to the at least one end cap fluid channel to form a fluid output. The at least one fluid output element is preferably designed as an opening of the end cap fluid channel, the opening facing away from the end cap cavity. The at least one wiper blade end cap around the at least one fluid output element preferably bounds an output recess which at least partially, preferentially mostly, has a rounded, in particular spherical, outer contour. A fluidic connection of the at least one end cap fluid channel to the at least one fluid output element, in particular the fluidic output element, preferably has a smaller throughflow cross section than the at least one end cap fluid channel. An advantageous distribution of output fluid, in particular output wiping liquid, can be achieved. An advantageously widened fluid output surface can be achieved, in particular in relation to a wiper blade device without an output of fluid from the wiper blade end cap. It is possible, for example, to achieve a viewing window of a windscreen that is advantageously enlarged and is wipeable with fluid wetting. It is advantageously possible to increase a safety standard.

It is furthermore proposed that the at least one wiper blade end cap has at least one fluid output element which has a fluid output direction which is oriented at least substantially transversely with respect to an, in particular the already mentioned, main axis of extent of the fluid channel. The main axis of extent of the at least one fluid channel is preferably oriented at least substantially parallel to the main axis of extent of the at least one wiper blade end cap. The fluid output direction is preferably an averaged direction of an output of fluid of at least most of the fluid, preferentially the wiping liquid, during a fluid output process. The fluid output direction of the at least one fluid output element preferably has a maximum deviation from a direction transversely, in particular from an angle of 90°, with respect to the main axis of extent of the at least one fluid channel, which deviation is at maximum 30°, preferentially at maximum 20°, particularly preferentially at maximum 10°. An advantageously uniform fluid output pattern can be achieved. An output of fluid into a region to be wiped can advantageously be achieved. An advantageously large portion of fluid can be used for cleaning during a wiping operation. In particular, an advantageously fluid-saving wiper blade device can be formed.

Furthermore, it is proposed that the at least one wiper blade end cap comprises at least one further fluid output element which is arranged on the same side of the wiper blade end cap as the at least one fluid output element. The at least one wiper blade end cap preferably has at least one fluid output element and at least one further fluid output element, which are fluidically connected to the at least one end cap fluid channel in the at least one connection extension. The at least one fluid output element is preferably arranged spaced apart from the at least one further fluid output element. The at least one further fluid output element can have a fluid output direction which is oriented at least substantially up to a deviation of at maximum 30°, preferably of at maximum 20°, particularly preferentially of at maximum 10°, transversely, in particular perpendicularly, with respect to the main axis of extent of the at least one fluid channel. The fluid output direction of the at least one further fluid output element preferably differs by at least 5°, preferentially by at least 30°, particularly preferentially by at least 45°, and very particularly preferentially by at least 60°, from the fluid output direction of the at least one fluid output element. An output of fluid into an advantageously enlarged region, in particular viewing region, of a windscreen to be wiped can be achieved. In particular, an overlapping region of two windscreen wipers on a windscreen can advantageously be wetted with wiping liquid.

Furthermore, it is proposed that the at least one fluid output element and/or the at least one further fluid output element of the at least one wiper blade end cap has a fluid output direction which differs from a fluid output direction of the at least one fluid output opening by at least 10°. The fluid output direction of the at least one fluid output element preferably differs from the fluid output direction of the at least one fluid output opening by at least 12.5°, preferentially by at least 15°, particularly preferentially by at least 20°, and very particularly preferentially by at least 25°. The fluid output direction of the at least one further fluid output element preferably differs from the fluid output direction of the at least one fluid output opening by at least 30°, preferentially at least 45°, particularly preferentially at least 60°, and very particularly preferentially at least 75°. An advantageous output of fluid can be achieved which wets an entire near region of the wiper lip, which near region is located in a wiping direction during a wiping movement, with wiping liquid. An advantageously large wetting area can be achieved by the output of fluid irrespective of the end cap geometry. An advantageous extension of a windscreen region which can be wiped with fluid, in particular with wiping liquid, can be achieved.

Furthermore, it is proposed that the at least one wiper blade end cap has at least one, in particular the already mentioned, end cap fluid channel, which extends through the at least one connection extension to the at least one fluid output element and which has a maximum extent in a direction which is shorter than a maximum extent of the at least one wiper blade end cap in the same direction. The at least one end cap fluid channel preferably extends over at least 30%, preferentially over at least 50%, particularly preferentially over at least 80%, and very particularly preferentially over at least 90%, of a maximum extent of the at least one connection extension in a direction of the main axis of extent of the at least one connection extension. The at least one end cap fluid channel preferably extends over at least 30%, preferentially over at least 50%, particularly preferentially over at least 80%, and very particularly preferentially over at least 90%, of a maximum extent of the at least one connection extension in a direction perpendicular to the main axis of extent of the at least one connection extension. The at least one end cap fluid channel preferably has a rounded outer contour. The at least one end cap fluid channel preferably has a throughflow cross section which is constant over at least 50%, preferentially over at least 75%, of its maximum extent along its main axis of extent. The at least one connection extension preferably extends at least substantially parallel to the main axis of extent of the wiper blade end cap. The at least one connection extension preferably extends over at maximum 90%, preferentially at maximum over 75%, particularly preferentially at maximum over 50%, of a maximum extent of the wiper blade end cap in the direction of the main axis of extent of the wiper blade end cap. An advantageous supply of fluid of the at least one fluid output element and/or of the at least one further fluid output element can be achieved.

Furthermore, it is proposed that the at least one wiper blade end cap has at least one further end cap fluid channel which is fluidically separated from the at least one end cap fluid channel. The at least one further end cap fluid channel is preferably fluidically connected to at least one further fluid channel and/or to the at least one fluid channel. The at least one fluid channel and/or the at least one further fluid channel are/is preferably fluidically connected to at least one fluid reservoir via a fluid feedline and/or at least one further fluid feedline. The at least one further end cap fluid channel preferably runs at least substantially parallel to the at least one end cap fluid channel. The at least one further end cap fluid channel is preferably arranged on a side of the wiper blade end cap opposite the at least one end cap fluid channel. The at least one wiper blade end cap preferably has at least one further connection extension. The at least one further end cap fluid channel is preferably arranged in the further connection extension of the at least one further wiper blade end cap. The at least one further end cap fluid channel preferably extends over at least 30%, preferentially over at least 50%, particularly preferentially over at least 80%, and very particularly preferentially over at least 90%, of a maximum extent of the at least one further connection extension in a direction of a main axis of extent of the at least one further connection extension. The at least one further end cap fluid channel preferably has a rounded outer contour. The at least one further end cap fluid channel preferably has a constant throughflow cross section over at least 50%, preferentially over at least 75%, of its maximum extent along its main axis of extent. The at least one further connection extension preferably extends at least substantially parallel to the main axis of extent of the wiper blade end cap. The at least one further connection extension preferably extends over at maximum 90%, preferentially over at maximum 75%, particularly preferentially over at maximum 50%, of a maximum extent of the wiper blade end cap in the direction of the main axis of extent of the at least one wiper blade end cap. An advantageous possibility of outputting fluid on two mutually averted sides of the at least one wiper blade end cap can be achieved. Advantageously, a symmetrical, in particular symmetrically loaded, wiper blade end cap can be achieved. An advantageously low-wearing wiper blade end cap can be achieved. Advantageously, at least two independent fluid paths can be achieved in the wiper blade end cap. A replacement fluid line in the at least one wiper blade end cap can be achieved.

Furthermore, it is proposed that the at least one wiper blade end cap comprises at least one additional fluid output element which is arranged on a side of the at least one wiper blade end cap that faces away from the at least one fluid output element. The at least one wiper blade end cap preferably comprises at least two additional fluid output elements. The at least two additional fluid output elements are preferably arranged on a side of the at least one wiper blade end cap that is remote from the at least one fluid output element. The at least one additional fluid output element is preferably fluidically connected to the at least one further end cap fluid channel. The at least one additional fluid output element preferably has a fluid output direction which differs from an axis perpendicular relative to the main axis of extent of the wiper blade end cap by the same angle as the fluid output direction of the at least one fluid output element. The at least one additional fluid output element preferably has a fluid output direction which differs from the fluid output direction of the at least one output opening by the same angle as the fluid output direction of the at least one fluid output element. The at least one wiper blade end cap preferably has at least one further additional fluid output element. The at least one further additional fluid output element is preferably arranged on the same side of the wiper blade end cap as the at least one additional fluid output element. The at least one further additional fluid output element preferably has a fluid output direction which differs from the fluid output direction of the at least one additional fluid output element. The at least one further additional fluid output element preferably has a fluid output direction which differs from an axis perpendicular relative to the main axis of extent of the wiper blade end cap by the same angle as the fluid output direction of the at least one further fluid output element. The at least one further additional fluid output element preferably has a fluid output direction which differs from a direction opposed to the fluid output direction of the at least one output opening by the same angle by which the fluid output direction of the at least one fluid output element differs from the fluid output direction of the at least one output opening. The fluid output directions of all of the fluid output elements are preferably oriented facing a surface to be wiped, in particular windscreen. An advantageously versatile wiper blade end cap with a fluid output function, in particular in both designated wiping directions of a wiping process, of the wiper blade device can be achieved. An advantageous wiper blade end cap which can be produced and/or can be mounted in a simple manner, in particular because of being of symmetrical design, can be achieved. Symmetrical fluid output conditions can advantageously be achieved.

Furthermore, it is proposed that the wiper blade device has at least one sealing unit which is provided to seal a connection between the fluid channel and a connection extension of the wiper blade end cap. The at least one sealing unit preferably has at least one sealing element which is provided to fluidically seal the at least one fluid channel, in particular in relation to the at least one, in particular further, connection extension. The at least one sealing unit preferably has at least one further sealing element which is provided to fluidically seal the at least one further fluid channel. The at least one wiper blade end cap preferably has, for coupling to the at least one fluid channel and/or to the at least one further fluid channel, preferably on the at least one attachment extension and/or on the at least one further attachment extension, at least one seal, in particular at least one sealing edge, in particular by means of which a fluidically tight coupling can be achieved. The at least one connection extension and/or the at least one further connection extension preferably has at least one seal, in particular on an outer surface, preferentially an outer surface which, in at least one operating state, is in contact with the element bounding at least one fluid channel and/or with the element bounding at least one further fluid channel. Alternatively or additionally, the at least one seal can also comprise a sealing ring, for example an O ring, and/or a further seal familiar to a person skilled in the art. An advantageously fluidically sealed connection can be achieved. A wiper blade device which is advantageously economical, in particular economical in terms of material and/or costs, can be achieved. An advantageous distribution of fluid, in particular between the fluid channel and the wiper blade end cap, for an exclusive output to support a wiping process, can be ensured.

Furthermore, a wiper system with at least one wiper arm, with at least one wiper blade and with at least one wiper blade device according to the invention is proposed. The wiper arm preferably has the at least one fluid feedline and/or the at least one further fluid feedline for coupling to the at least one fluid channel.

The wiper blade device according to the invention and/or the wiper system according to the invention are/is not intended to be limited here to the application and embodiment described above. In particular, the wiper blade device according to the invention and/or the wiper system according to the invention can have a number of individual elements, components and units differing from a number mentioned here, for carrying out a manner of operation described here. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawing. The drawing illustrates three exemplary embodiments of the invention. The drawing, the description and the claims contain numerous features in combination. A person skilled in the art will expediently also consider the features individually and combine them to form meaningful further combinations.

In the drawing.

DETAILED DESCRIPTION

Figure 1:
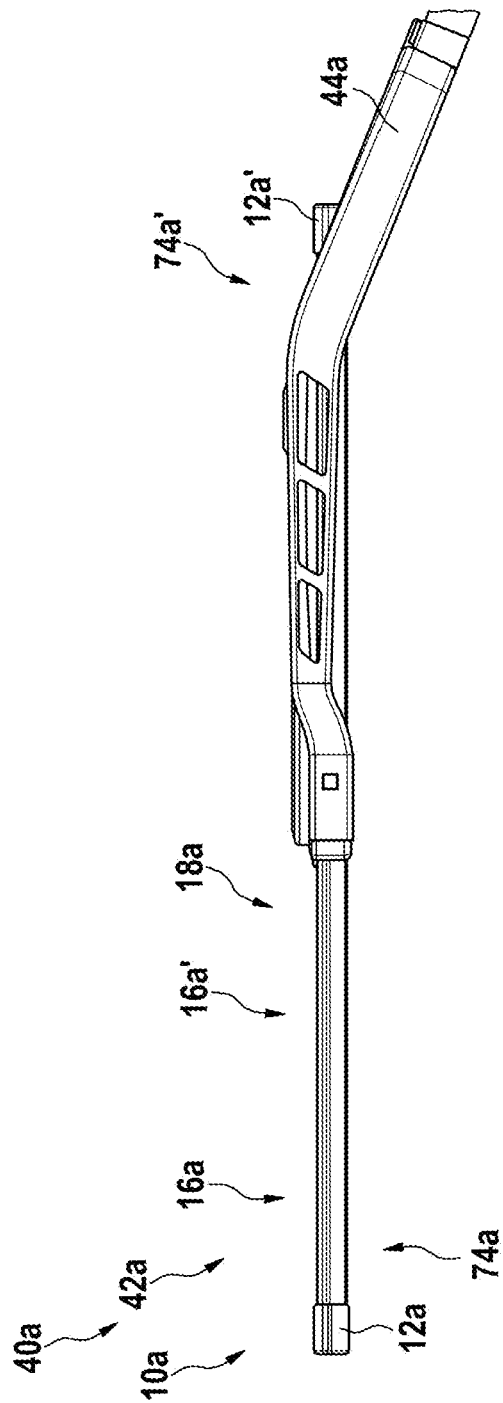
FIG. 1 shows a wiper system according to the invention in a schematic illustration.

FIG. 1 shows a wiper system 40a. The wiper system 40a comprises at least one wiper arm 44a and at least one wiper blade 42a. The wiper blade 42a comprises at least one wiper blade device 10a.

The wiper blade 42a comprises a wiper strip unit which has a wiper lip.

Figure 2:
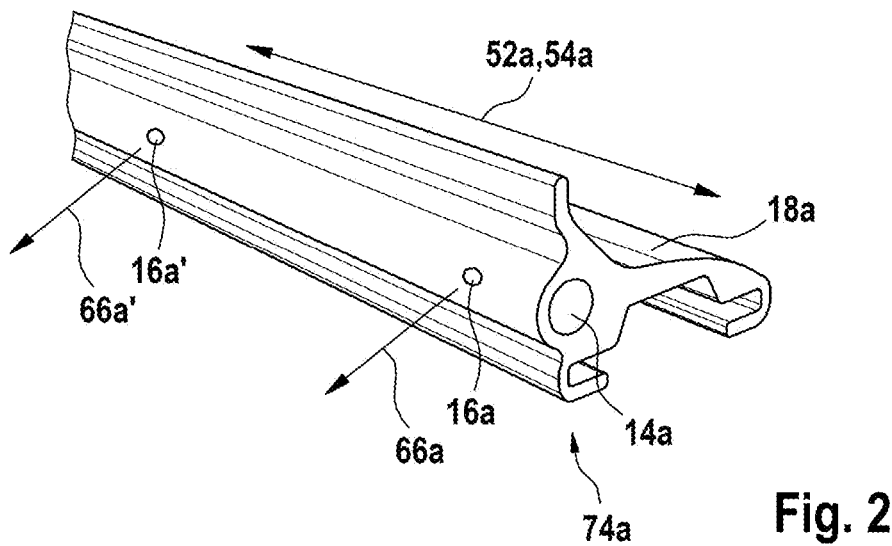
FIG. 2 shows a wind deflector unit of a wiper blade device according to the invention in a schematic illustration.

The wiper blade device 10a comprises at least one fluid channel 14a. The wiper blade device 10a comprises at least one wind deflector unit 18a. The at least one fluid channel 14a is arranged in the wind deflector unit 18a (cf. FIG. 2).

The fluid channel 14a comprises at least one, in particular, for example, two, fluid output opening/openings 16a, 16a'. The at least one fluid output opening 16a, 16a' is provided to form a fluid output. The, for example two, fluid output openings 16a, 16a' each have a fluid output direction 66a, 66a'. The, for example two, fluid output directions 66a, 66a' of the fluid output openings 16a, 16a' run in particular parallel to each other.

The fluid channel 14a extends over the maximum extent of the wind deflector unit 18a along a main axis of extent 54*a* of the wind deflector unit 18*a*. The fluid channel 14*a* can extend at least substantially along the main axis of extent 54*a* of the wind deflector unit 18*a* over a curved maximum extent of the wind deflector unit 18*a*. The wiper blade device 10*a* has at least one wiper blade end cap 12*a*, 12*a*'. The at least one wiper blade end cap 12*a*, 12*a*' forms at least one end piece of the fluid channel 14*a*, in particular for fluidic sealing of the fluid channel. The fluid channel 14*a* has two open end regions 74*a*, 74*a*' at the ends of its maximum extent.

The at least one wiper blade end cap 12*a*, 12*a*' has at least one connection extension 20*a*. The connection extension 20*a* is an elongate material element which is connected to the wiper blade end cap 12*a*, 12*a*'. The connection extension 20*a* is connected on one side to the wiper blade end cap 12*a*, 12*a*' in a direction perpendicular to a main axis of extent 58*a* of the wiper blade end cap 12*a*, 12*a*'. The connection extension 20*a* is connected to the wiper blade end cap 12*a*, 12*a*' on an inner wall 60*a* in a central region of the wiper blade end cap 12*a*, 12*a*'. The connection extension 20*a* is formed integrally with, in particular from the same material as, the wiper blade end cap 12*a*, 12*a*'. The connection extension 20*a* extends from the central region of the inner wall 60*a* of the wiper blade end cap 12*a*, 12*a*' through a cavity 56*a* bounded by the wiper blade end cap 12*a* in the direction of the main axis of extent 58*a* of the wiper blade end cap 12*a*, 12*a*' as far as an end of a maximum extent of the wiper blade end cap 12*a*, 12*a*'. The wiper blade end cap 12*a*, 12*a*' is connected at the open end regions 74, 74*a*' to the at least one fluid channel 14*a*, in particular is at least partially inserted into the fluid channel 14*a*.

The connection extension 20*a* bounds a cavity 38*a* in its interior. The cavity 38*a* is provided to increase an elasticity, in particular ease of installation, of the at least one wiper blade end cap 12*a*, 12*a*'. The cavity 38*a* is provided to reduce a weight of the wiper blade end cap 12*a*, 12*a*'. The connection extension 20*a* is provided to fluidically close the fluid channel 14*a*.

The connection extension 20*a* is partially arranged, in particular with a free end, in the fluid channel 14*a* in at least one operating state. In at least one operating state, the connection extension 20*a* is plugged into the fluid channel 14*a* by a plug-in extent 70*a* of in particular at least 0.5 cm. In at least one operating state, the connection extension 20*a* partially, in particular with a free end, in a region of the fluid channel 14*a* in the circumferential direction of the connection extension 20*a*, lies completely against an element bounding the fluid channel 14*a*, in particular the wind deflector unit 18*a*.

The connection extension 20*a* has at least one sealing side 62. The sealing side 62*a* is arranged at a free end of the maximum extent in the direction of the main axis of extent 58*a* of the wiper blade end cap 12*a*. The sealing side 62*a* has a rounded outer contour. The rounded outer contour of the sealing side 62*a* can facilitate installation of the wiper blade end cap 12*a*, 12*a*' and/or can positively influence a fluid pressure in the fluid channel 14*a*. It is conceivable for the sealing side 62*a* to have a planar outer contour. The wiper blade device 10*a* has at least one sealing unit 72*a*. The sealing unit 72*a* is provided to seal an, in particular fluidic, connection between the fluid channel 14*a* and the connection extension 20*a* of the wiper blade end cap 12*a*. The sealing unit 72*a* comprises a sealing ring 64*a*. The sealing ring 64*a* is arranged on the connection extension 20*a*. The sealing ring 64*a* engages around the connection extension 20*a*. The wiper blade end cap 12*a* provides the possibility of fluidically sealing the fluid channel.

Figure 3:
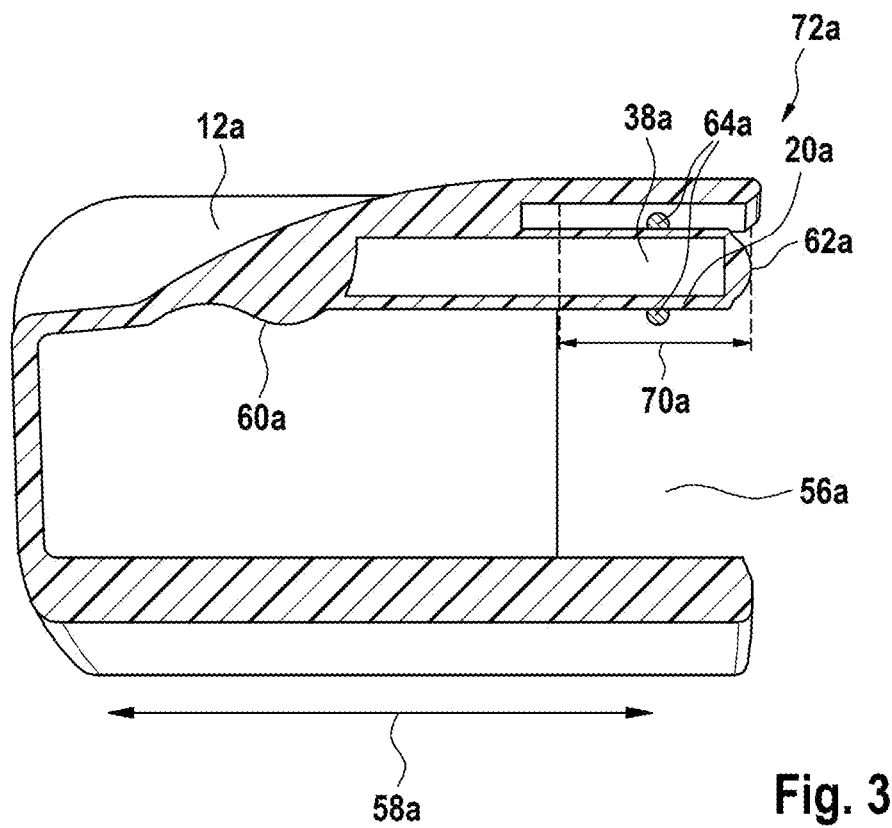
FIG. 3 shows a wiper blade end cap of a wiper blade device according to the invention in a schematic sectional illustration.

FIGS. 4 to 7 show further exemplary embodiments of the invention. The descriptions below and the drawings are limited essentially to the differences between the exemplary embodiments, wherein, with regard to identically denoted components, in particular with regard to components having the same reference signs, reference can basically also be made to the drawings and/or the description of the other exemplary embodiments, in particular of FIGS. 1 to 3. To differentiate between the exemplary embodiments, the letter a is placed after the reference sign of the exemplary embodiment in FIGS. 1 to 3. In the exemplary embodiments of FIGS. 4 to 7, the letter a is replaced by the letters b and c.

Figure 4:
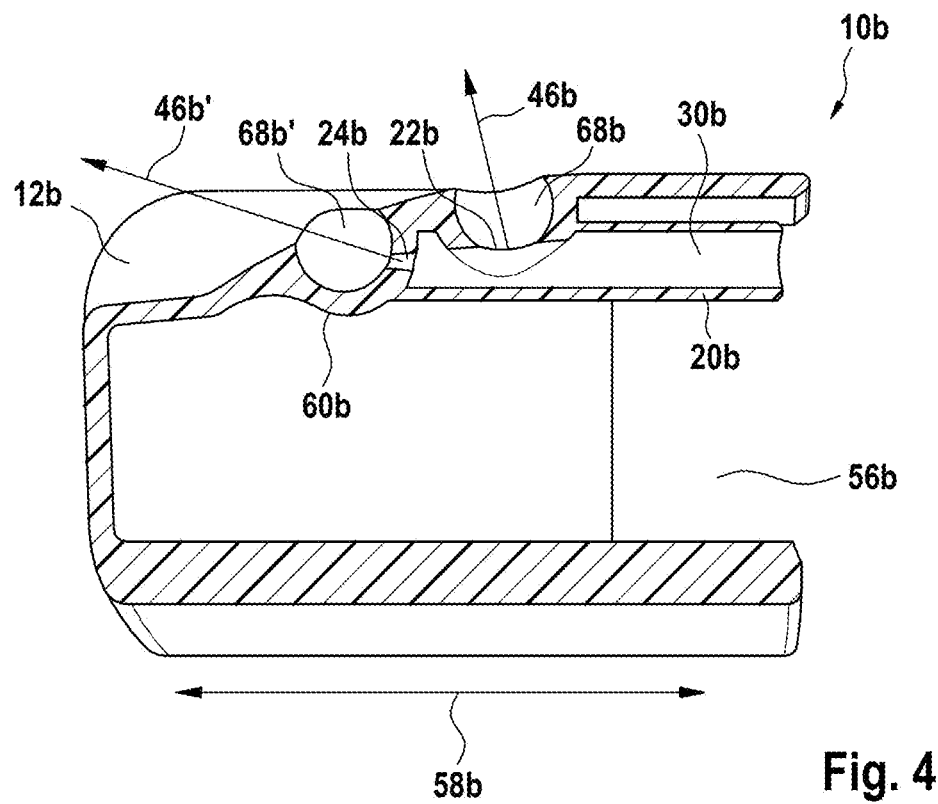
FIG. 4 shows a wiper blade end cap of an alternative refinement of a wiper blade device according to the invention in a schematic sectional illustration.

FIG. 4 shows a wiper blade end cap 12*b*, 12*b*' of an alternative wiper blade device 10*b*. The at least one wiper blade end cap 12*b*, 12*b*' has at least one fluid output element 22*b*. The at least one wiper blade end cap 12*b*, 12*b*' comprises at least one further fluid output element 24*b* which is arranged on the same side of the wiper blade end cap 12*b*, 12*b*' as the at least one fluid output element 22*b*.

The connection extension 20*b* is provided to fluidically connect the fluid channel 14*b* to the at least one fluid output element 22*b* of the wiper blade end cap 12*b*. In at least one operating state, the connection extension 20*b* is partially arranged in the fluid channel 14*b*, in particular is inserted into the fluid channel 14*b*. The at least one wiper blade end cap 12*b*, 12*b*' has at least one end cap fluid channel 30*b*. The end cap fluid channel 30*b* extends through the at least one connection extension 20*b* to the at least one fluid output element 22*b*. The connection extension 20*b* bounds the end cap fluid channel 30*b*. The end cap fluid channel 30*b* has a maximum extent in a direction which is shorter than a maximum extent of the at least one wiper blade end cap 12*b*, 12*b*' in the same direction. The at least one fluid output element 22*b* and/or the at least one further fluid output element 24*b* is in the form of an opening of the end cap fluid channel 30*b* in the direction of an outer region of the wiper blade end cap 12*b*, 12*b*'. The at least one fluid output element 22*b* and/or the at least one further fluid output element 24*b* is enclosed by a spherical outer contour. The at least one wiper blade end cap 12*b*, 12*b*' bounds around the at least one fluid output element 22*b* and/or the at least one further fluid output element 24*b* bounds an output recess 68*b*, 68*b*'. The output recess 68*b*, 68*b*' largely has a spherical outer contour. The fluid output element 22*b* has a fluid output direction 46*b* which is oriented at least substantially transversely with respect to a main axis of extent 52*b* of the fluid channel 14*b*. The fluid output element 22*b* has a fluid output direction 46*b* which encloses a minimum angle of at least 50° with respect to the main axis of extent 52*b* of the fluid channel 14*b*. The further fluid output element 24*b* has a fluid output direction 46*b* which encloses a minimum angle of at least 10° with respect to the main axis of extent 52*b* of the fluid channel 14*b*. The at least one fluid output element 22*b* of the at least one wiper blade end cap 12*b* has a fluid output direction 46*b* which differs from a fluid output direction 66*b* of the at least one fluid output opening 16*b* by at least 10°. The at least one further fluid output element 24*b* of the at least one wiper blade end cap 12*b* has a fluid output direction 46*b*' which differs from a fluid output direction 66*b* of the at least one fluid output opening 16*b* by at least 10°. The at least one fluid output element 22*b* of the at least one wiper blade end cap 12*b* has a fluid output direction 46*b* which differs from a fluid output direction 46*b*' of the at least one further fluid output element 24*b* by at least 30°.

Figure 5:
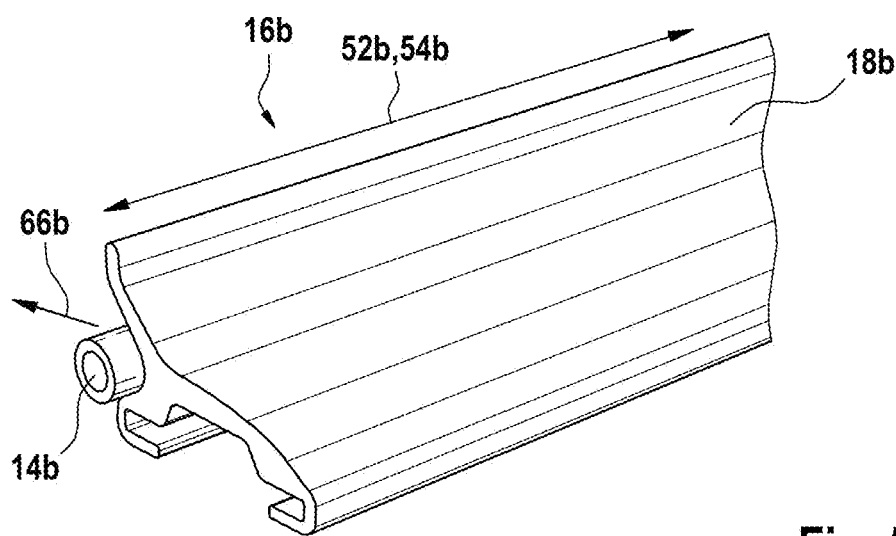
FIG. 5 shows a wiper blade end cap of an alternative refinement of a wiper blade device according to the invention in a schematic sectional illustration.

FIG. 5 shows that at least one fluid channel 14*b* is arranged on the wind deflector unit 18*b*. The fluid channel 14*b* is arranged outside the wind deflector unit 18*b* (cf. FIG.

5). The fluid channel 14b is bounded by a hose and/or a tube. The hose and/or the tube, in particular which bounds the fluid channel 14b, is connected, in particular adhesively bonded, clamped or clipped, to the wind deflector unit 18b. The configuration of the fluid channel 14b can easily be transferred to the further alternative refinements, in particular having the letter a or c. The wiper blade end cap 12b provides possibilities of guiding fluid, in particular water, through an inner path, in particular from the wiper blade 42b. The wiper blade end cap 12b provides the possibility of spraying fluid, in particular water, onto a windscreen. The at least one wiper blade end cap 12b, 12b' forms at least one end piece of the fluid channel 14b, in particular for fluidic connection to at least one fluid output element 22b.

Figure 6:
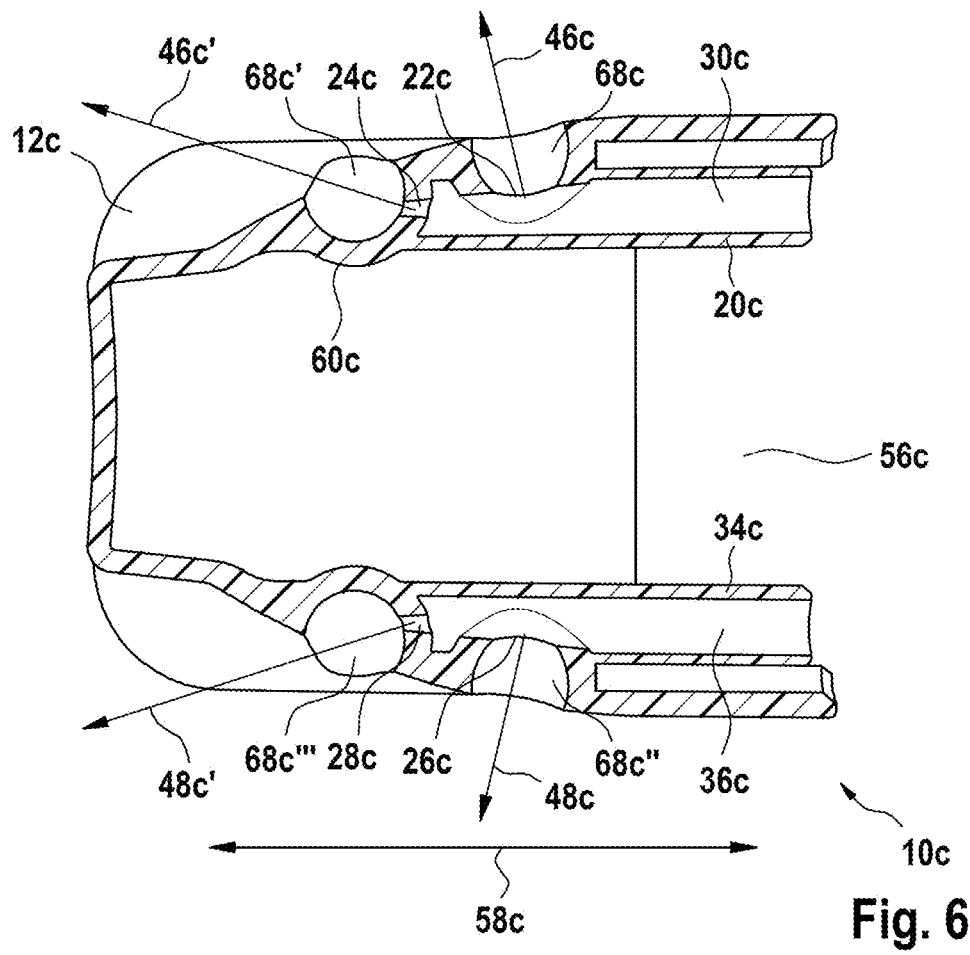
FIG. 6 shows a wind deflector unit of an alternative refinement of a wiper blade device according to the invention in a schematic illustration.

FIG. 6 shows a wiper blade end cap 12c, 12c' of an alternative wiper blade device 10c. The at least one wiper blade end cap 12c, 12c' is formed partially analogously to the wiper blade end cap 12b, 12b' of the previous embodiment. The at least one wiper blade end cap 12c has at least one further connection extension 34c. The at least one wiper blade end cap 12c has at least one further end cap fluid channel 36c. The further end cap fluid channel 36c is fluidically separated from the at least one end cap fluid channel 30c. The at least one further end cap fluid channel 36c is bounded by the at least one further connection extension 34c and extends in particular through at least 90% of the maximum extent of the further connection extension 34c in the direction of the main axis of extent 58c of the wiper blade end cap 12c, 12c'. The at least one further connection extension 34c is arranged on a side of the at least one wiper blade end cap 12c that faces away from the at least one fluid output element 22c. In at least one operating state, the at least one further connection extension 34c connects at least one further fluid channel 32c to at least one additional fluid output element 26c (cf. FIGS. 6 and 7). The wiper blade end cap 12c, 12c' is formed mirror-symmetrically, in particular with respect to the arrangement of the connection extension 20c and of the further connection extension 34c.

The at least one wiper blade end cap 12c comprises the at least one additional fluid output element 26c. The at least one wiper blade end cap 12c comprises at least one further additional fluid output element 28c. The at least one additional fluid output element 26c is arranged on a side of the at least one wiper blade end cap 12c that faces away from the at least one fluid output element 22c. The at least one further additional fluid output element 28c is arranged on a side of the at least one wiper blade end cap 12c that faces away from the at least one fluid output element 22c. The at least one wiper blade end cap 12c, 12c' bounds around the at least one additional fluid output element 26c and/or the at least one further additional fluid output element 28c bounds an output recess 68c", 68c'".

The at least one additional fluid output element 26c of the at least one wiper blade end cap 12c has a fluid output direction 48c which differs from a fluid output direction 66c, 66c' of the at least one fluid output opening 16c, 16c', in particular opening of the at least one nozzle element 50c, 50c', by at least 50°. The at least one further additional fluid output element 28c of the at least one wiper blade end cap 12c has a fluid output direction 48c' which differs from a fluid output direction 66c of the at least one fluid output opening 16c by at least 10°. The at least one additional fluid output element 26c of the at least one wiper blade end cap 12 has a fluid output direction 48c which differs from a fluid output direction 48c' of the at least one further additional fluid output element 28c by at least 30°. The wiper blade end cap 12c, 12c' is formed mirror-symmetrically with respect to the fluid output directions 46c, 46c', 48c, 48c' of the fluid output elements 22c, 24c, 26c, 28c.

Figure 7:
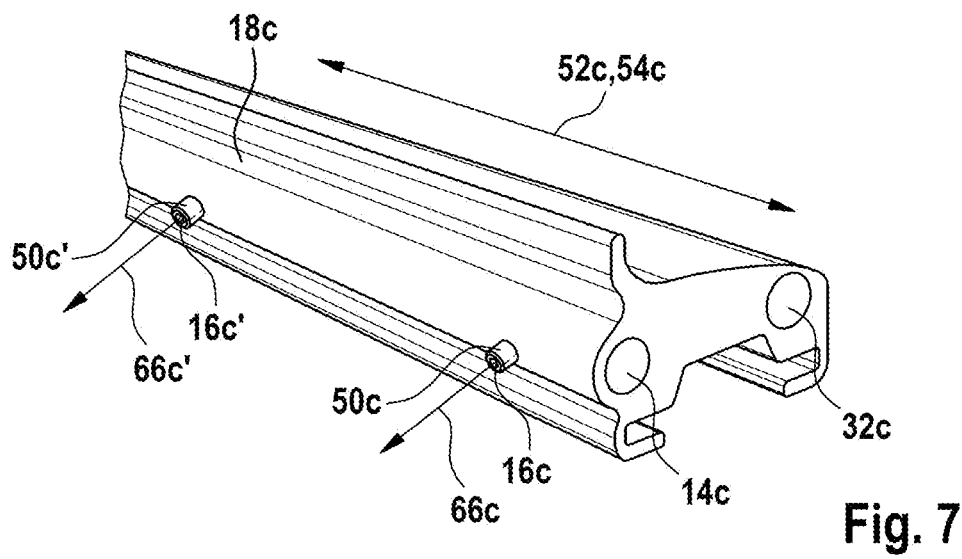
FIG. 7 shows a wind deflector unit of an alternative refinement of a wiper blade device according to the invention in a schematic illustration.

FIG. 7 shows that the fluid channel 14c comprises at least one nozzle element 50c, 50c'. The at least one fluid output opening 16c, 16c' is in the form of the at least one nozzle element 50c, 50c'. In particular, the fluid channel 14c comprises, for example, two nozzle elements 50c, 50c'. The at least one nozzle element 50c, 50c' can easily be transferred to the embodiments of the wind deflector units 18a, 18b of the further alternative refinements, in particular having the letter a or b.

What is claimed is:

1. A wiper blade device comprising
at least one fluid channel (14a; 14b; 14c) which has at least one fluid output opening (16a, 16a'; 16b, 16b'; 16c, 16c') to form a fluid output,
at least one wind deflector unit (18a; 18b; 18c), and
at least one wiper blade end cap (12a, 12a'; 12b, 12b'; 12c, 12c') which forms at least one end piece of the fluid channel (14a; 14b; 14c), wherein the wiper blade end cap (12a, 12a'; 12b, 12b'; 12c, 12c') includes an outer wall that defines an interior cavity (56a, 56b, 56c) within the wiper blade end cap (12a, 12a'; 12b, 12b'; 12c, 12c'), wherein the interior cavity (56a; 56b; 56c) is configured to receive an end of a wiper strip unit, such that the outer wall extends over the end of the wiper strip unit and at least three sides of the wiper strip unit, wherein the wiper blade end cap (12a, 12a'; 12b, 12b'; 12c, 12c') also includes a connection extension (20a; 20b; 20c) that extends from the outer wall and within the interior cavity (56a; 56b; 56c).

2. The wiper blade device according to claim 1, characterized in that the at least one connection extension (20a; 20b; 20c) is configured to fluidically connect the fluid channel (14a; 14b; 14c) to a fluid output element (22a; 22b; 22c) of the wiper blade end cap (12a, 12a'; 12b, 12b'; 12c, 12c').

3. The wiper blade device according to claim 2, characterized in that the at least one wiper blade end cap (12b, 12b'; 12c, 12c') comprises at least one further fluid output element (24b; 24c) which is arranged on the same side of the wiper blade end cap (12b, 12b'; 12c, 12c') as the at least one fluid output element (22b; 22c).

4. The wiper blade device according to claim 3, characterized in that the at least one fluid output element (22b; 22c) and/or the at least one further fluid output element (24b; 24c) of the at least one wiper blade end cap (12b, 12b'; 12c, 12c') has a fluid output direction (46b, 46b'; 46c, 46c') which differs from a fluid output direction (66b, 66b'; 66c, 66c') of the at least one fluid output opening (16b, 16b'; 16c, 16c') by at least 10°.

5. The wiper blade device at least according to claim 2, characterized in that the at least one wiper blade end cap (12c, 12c') comprises at least one additional fluid output element (26c) which is arranged on a side of the at least one wiper blade end cap (12c, 12c') that faces away from the at least one fluid output element (22c).

6. The wiper blade device according to claim 1, characterized in that the at least one wiper blade end cap (12b, 12b'; 12c, 12c') has at least one fluid output element (22b; 22c) which has a fluid output direction (46b; 46c) which is oriented at least substantially transversely with respect to a main axis of extent (52b; 52c) of the fluid channel (14b; 14c).

7. The wiper blade device at least according to claim 6, characterized in that the at least one wiper blade end cap (12b, 12b'; 12c, 12c') has at least one end cap fluid channel (30b; 30c) which extends through the at least one connection extension (20b; 20c) to the at least one fluid output element (22b, 22b'; 22c, 22c') and which has a maximum extent in a direction which is shorter than a maximum extent of the at least one wiper blade end cap (12b, 12b'; 12c, 12c') in the same direction.

8. The wiper blade device according to claim 7, characterized in that the at least one wiper blade end cap (12c, 12c') has at least one further end cap fluid channel (36c) which is fluidically separated from the at least one end cap fluid channel (30c).

9. The wiper blade device according to claim 1, characterized by at least one sealing unit (72a; 72b; 72c), which is configured to seal a connection between the fluid channel (14a; 14b; 14c) and the connection extension (20a; 20b; 20c) of the wiper blade end cap (12a, 12a'; 12b, 12b'; 12c, 12c').

10. A wiper system (40a) with at least one wiper arm (44a), with at least one wiper blade (42a) which comprises at least one wiper blade device (10a; 10b; 10c) according to claim 1.

11. The wiper blade device according to claim 1, wherein the at least one fluid output opening (16a, 16a'; 16b, 16b'; 16c, 16c') is formed by at least one nozzle element (50a, 50a'; 50b, 50b'; 50c, 50c').

12. The wiper blade device according to claim 1, wherein the fluid channel (14a; 14b; 14c) is disposed within the wind deflector unit (18a; 18b; 18c).

13. The wiper blade device according to claim 1, wherein the fluid channel (14a; 14b; 14c) is disposed outside of the wind deflector unit (18a; 18b; 18c).

14. The wiper blade device according to claim 13, wherein the fluid channel (14a; 14b; 14c) is disposed on the wind deflector unit (18a; 18b; 18c).

15. The wiper blade device according to claim 1, wherein the connection extension (20a; 20b; 20c) is configured to fluidically close the fluid channel (14a; 14b; 14c).

16. The wiper blade device according to claim 1, wherein the connection extension (20a; 20b; 20c) extends linearly within the cavity (56a; 56b; 56c), parallel to a main axis of extent (52b; 52c) of the fluid channel (14b; 14c).

17. The wiper blade device according to claim 1, wherein the connection extension (20a; 20b; 20c) extends parallel to a portion of the outer wall of the wiper blade end cap (12a, 12a'; 12b, 12b'; 12c, 12c').

18. The wiper blade device according to claim 1, wherein the connection extension (20a; 20b; 20c) defines a fluid channel (30b; 30c).

19. The wiper blade device according to claim 1, wherein the outer wall of the wiper blade end cap (12a, 12a'; 12b, 12b'; 12c, 12c') defines a fluid output element (22a; 22b; 22c) that extends through the outer wall and is in fluid communication with the fluid channel (30b; 30c).

20. The wiper blade device according to claim 1, further comprising the wiper strip unit, wherein the end of the wiper strip unit is disposed within the interior cavity (56a; 56b; 56c) of the end cap (12a, 12a'; 12b, 12b'; 12c, 12c').

* * * * *